United States Patent
Hong

(10) Patent No.: US 8,736,222 B2
(45) Date of Patent: May 27, 2014

(54) FLUX CONTROLLER FOR INDUCTION MOTOR

(75) Inventor: Chan Ook Hong, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 370 days.

(21) Appl. No.: 13/279,203

(22) Filed: Oct. 21, 2011

(65) Prior Publication Data

US 2012/0091941 A1    Apr. 19, 2012

(30) Foreign Application Priority Data

Nov. 30, 2010 (KR) .................. 10-2010-0120433

(51) Int. Cl.
*H02P 21/04* (2006.01)

(52) U.S. Cl.
USPC ............................ 318/804; 318/766; 318/799

(58) Field of Classification Search
CPC . H02P 21/146; H02P 21/141; H02P 21/0042; H02P 21/13; H02P 2203/11; H02P 2207/01; H02P 21/0032; H02P 21/0089; H02P 21/04; H02P 2207/05; H02P 6/183
USPC ......... 318/727, 729, 766, 767, 798, 799, 804, 318/806
See application file for complete search history.

(56) References Cited

U.S. PATENT DOCUMENTS

| 6,667,597 | B2 * | 12/2003 | Fedigan et al. | 318/800 |
| 6,777,906 | B1 * | 8/2004 | Kinpara et al. | 318/727 |
| 6,940,253 | B2 * | 9/2005 | Hinkkanen | 318/804 |

FOREIGN PATENT DOCUMENTS

| JP | 08-9697 | 1/1996 |
| JP | 11-187700 | 7/1999 |
| JP | 2000312499 | 11/2000 |
| JP | 2005-130601 | 5/2005 |
| JP | 2005-278327 | 10/2005 |
| JP | 2007-6664 | 1/2007 |
| KR | 20020082946 | 11/2002 |

OTHER PUBLICATIONS

Japan Patent Office Application Serial No. 2011-260613, Office Action dated Jun. 4, 2013, 3 pages.
The State Intellectual Property Office of the People's Republic of China Application Serial No. 201110396857.6, Office Action dated Dec. 4, 2013, 6 pages.

* cited by examiner

*Primary Examiner* — Bentsu Ro
(74) *Attorney, Agent, or Firm* — Lee, Hong, Degerman, Kang & Waimey

(57) ABSTRACT

Disclosed is a flux controller for maintaining reliable flux estimation performance in a low velocity region, the controller including a velocity controller, a torque current controller for outputting a torque voltage command, a flux controller for outputting a flux current command, a flux current controller for receiving the flux current command to output a flux voltage command, a three-phase converter for converting the torque voltage command and the flux voltage command into a three-phase voltage command applied to the induction motor to output the three-phase voltage command, a flux estimator for outputting a rotating angle of a rotor of the induction motor, an estimated flux value of the rotor and an estimated velocity of the rotor, and a flux regulator for receiving the torque voltage command and the estimated velocity to output a gain value that regulates a magnitude of the flux command.

12 Claims, 4 Drawing Sheets

FLUX CONTROLLER FOR INDUCTION MOTOR

CROSS-REFERENCE TO RELATED APPLICATION

Pursuant to 35 U.S.C. §119(a), this application claims the benefit of earlier filing date and right of priority to Korean Patent Application No. 10-2010-0120433, filed Nov. 30, 2010, the contents of which are hereby incorporated herein by reference in their entirety.

BACKGROUND OF THE INVENTION

1. Field of the Invention

The present invention relates generally to a flux controller for an induction motor and, more particularly, to a flux control apparatus capable of minimizing a decline in flux estimation performance in a low velocity region in a drive inverter system of an induction motor using a sensorless vector control method.

2. Description of the Related Art

Generally, methods for driving an induction motor at variable velocity without using a velocity sensor or a position sensor includes a constant voltage/frequency (VF) control method that is an open loop control method, and a sensorless vector control method that estimates a flux position of a motor rotor from measurements of a voltage, a current, and motor parameters. Since the latter method is excellent in terms of performance for controlling velocity and load variations, the sensorless vector control method has been widely used.

However, the sensorless vector control method is problematic in that voltage required to drive a motor in the low velocity region is reduced, so that voltage (inverter output voltage) inputted into the motor may be erroneously estimated due to offset or dead time, whereby flux estimation performance is deteriorated. Consequently, the sensorless vector control method fails to exhibit sufficient performance in the low velocity region in comparison with a high velocity region.

FIG. 1 is a block diagram illustrating an induction motor system driven at variable velocity by the sensorless vector control method without a velocity (position) sensor.

An inverter 101 outputs voltage to a sensorless induction motor 102 to operate the sensorless induction motor 102 according to a velocity command $W^*_m$ inputted by a user.

A subtractor 103 calculates a difference between a velocity command $W^*_m$ inputted from an exterior and an estimated velocity $W_m$ that is one of outputs of a sensorless flux estimator 115, thus detecting a velocity error.

A velocity controller 104 functions to output a current command. $K_{p\_s}$ means a proportional gain, $K_{i\_s}$ means an integral gain, and s means a Laplace operator.

A subtractor 105 calculates a difference between a torque current command $i^*_q$ and a torque current $i_d$ to detect a torque current error.

In a torque current controller 106, $K_{p\_q}$ means a proportional gain and $K_{i\_q}$ means an integral gain.

A subtractor 107 calculates a difference between a flux command $\lambda^*_{dr}$ and an estimated flux $\lambda_{dr}$ that is the output of the sensorless flux estimator 115 to detect a flux error.

In a flux controller 108, $K_{p\_f}$ means a proportional gain and $K_{i\_f}$ means an integral gain.

A subtractor 109 calculates a difference between a flux current command $i^*_d$ and a flux current $i_d$ to detect a flux current error.

In a flux current controller 110, $K_{p\_d}$ means a proportional gain and $K_{i\_d}$ means an integral gain.

A three-phase converter 111 receives an electric rotating angle $\theta_e$ of a rotor flux of the induction motor 102 from the sensorless flux estimator 115, and converts a torque voltage command $V^*_q$ that is output of the current controllers 106 and 110 and a flux voltage command $V^*_d$ into a three-phase voltage command, $V^*_a$, $V^*_b$ and $V^*_c$.

A voltage controller 112 includes a power semiconductor device (IGBT), and receives the three-phase voltage command, namely, $V^*_a$, $V^*_b$ and $V^*_c$, thus applying three-phase output voltage controlled by the voltage command $V^*_a$, $V^*_b$ and $V^*_c$ to the induction motor 102 through pulse width modulation (PWM).

Respective current sensors 113a, 113b and 113c are coupled to a three-phase output cable of the voltage controller 112 to detect a three-phase current, $i_a$, $i_b$ and $i_c$ flowing through the induction motor 102.

A two-phase converter 114 receives a flux angle $\theta_e$ of the rotor of the induction motor 102 and converts a three-phase current of the motor, $i_a$, $i_b$ and $i_c$ into a torque current $i_q$ and a flux current $i_d$.

The sensorless flux estimator 115 receives the three-phase current of the induction motor 102 from the current sensor 113a, 113b and 113c, and receives a voltage command from the torque current controller 106 and the flux current controller 110, thus outputting a rotating angle $\theta_e$ of the rotor flux, a magnitude $\lambda_{dr}$ of the rotor flux and a velocity $W_m$ of the motor rotor.

An operation of the above components will be described below in detail. If a user inputs a velocity command $W^*_m$ for a rotation of the induction motor 102, the subtractor 103 measures a difference between the velocity command $W^*_m$ and an estimated velocity $W_m$ outputted from the sensorless flux estimator 115 to calculate a velocity error, and inputs the calculated velocity error into the velocity controller 104. The velocity controller 104 calculates a torque current command $i^*_q$ for rotating the induction motor 102 according to the velocity command $W^*_m$, based on the inputted velocity error.

The subtractor 105 measures a difference between the torque current command $i^*_q$ that is the output of the velocity controller 104 and the torque current $i_q$ that is the output of the two-phase converter 114 to calculate a torque current error, and inputs the calculated error into the torque current controller 106.

The torque current controller 106 calculates a torque voltage command $V^*_q$ for enabling a torque current $i_q$ corresponding to the command $i^*_q$ to flow in the induction motor 102, based on the inputted torque current error.

A subtractor 107 measures a difference between the flux command $\lambda^*_{dr}$ and the flux estimation value $\lambda_{dr}$ inputted from the sensorless flux estimator 115 to calculate a flux error. A value of the flux command $\lambda^*_{dr}$ is previously calculated, and thereafter is stored in a memory unit (not shown) installed in the inverter 101. In equation (1), $V_{rate}$ and $Freq_{rate}$ are rated voltage and rated frequency of the motor, respectively.

$$\lambda * dr = \frac{\sqrt{(2)} \cdot V_{rate}}{\sqrt{(2)} \cdot 2\pi \cdot Freq_{rate}} \tag{1}$$

The flux controller 108 calculates the flux current command $i^*_d$ for establishing internal flux of the induction motor 102 according to $\lambda^*_{dr}$, based on the flux error. The subtractor 109 calculates a flux current error, that is, a difference between the flux current command $i^*_d$ and the flux current $i_d$ that is the output of the two-phase converter 114, and transmits the flux current error to the flux current controller 110.

The flux current controller 110 calculates a flux voltage command $V^*_d$ for enabling a flux current corresponding to the command $i^*_d$ to flow in the induction motor 102, based on the flux current error. The outputs $V^*_q$ and $V^*_d$ of the current controllers 106 and 110 are converted through the three-phase converter 111 into the three-phase voltage command $V^*_a$, $V^*_b$ and $V^*_c$ and then are inputted into the voltage controller 112.

The three-phase converter 111 receives the torque/flux voltage commands $V^*_q$ and $V^*_d$ and the rotating angle $\theta_e$ of the rotor flux of the induction motor 102, and converts the two-phase voltage command of the torque/flux into the three-phase voltage command using equations (2) and (3). In the equations (2) and (3), SIN and COS mean sine and cosine trigonometric functions, respectively.

$$V^*ds = -\text{SIN}(\theta e) \cdot V^*q + \text{COS}(\theta e) \cdot V^*d$$

$$V^*qs = \text{COS}(\theta e) \cdot V^*q + \text{SIN}(\theta e) \cdot V^*d \tag{2}$$

$$V^*a = V^*ds$$

$$V^*b = -0.5 \cdot (V^*ds - \sqrt{3} \cdot V^*qs)$$

$$V^*c = -0.5 \cdot (V^*ds + \sqrt{3} \cdot V^*qs) \tag{3}$$

The voltage controller 112 controls output voltage through pulse width modulation to apply voltage $V^*_a$, $V^*_b$, and $V^*_c$ from the three-phase converter 111 to the induction motor 102. The three-phase current $i_a$, $i_b$ and $i_c$ of the induction motor 102 is detected by three current detectors 113a, 113b and 113c, and is converted into the torque current $i_q$ and the flux current $i_d$ via the two-phase converter 114. The two-phase converter 114 converts the three-phase current $i_a$, $i_b$ and $i_c$ of the motor into the torque current $i_q$ that is in proportion to the output torque of the motor and the current $i_d$ that forms 90 degrees with the torque current and is in proportion to the flux of the motor, using equations (4) and (5). Here, $i_d$ and $i_q$ mean flux/torque current in a synchronous coordinate system, and $ids^s$ and $iqs^s$ means flux/torque current in a stationary coordinate system.

$$ids^S = \frac{2 \cdot ia - ib - ic}{3} \tag{4}$$

$$iqs^S = \frac{ib - ic}{\sqrt{3}}$$

$$id = \text{SIN}(\theta e) \cdot iqs^S + \text{COS}(\theta e) \cdot ids^S \tag{5}$$
$$iq = \text{COS}(\theta e) \cdot iqs^S - \text{COS}(\theta e) \cdot ids^S$$

The sensorless flux estimator 115 receives the three-phase current $i_a$, $i_b$ and $i_c$ of the induction motor 102, an output $V^*_q$ of the torque current controller 106, an output $V^*_d$ of the flux current controller 110, and outputs the rotating angle $\theta_e$ of the rotor flux of the induction motor 102, the magnitude $\lambda_{dr}$ of the rotor flux and the velocity $W_m$ of the motor rotor. As shown in FIG. 2, the sensorless flux estimator 115 includes two units therein, that is, a flux estimation unit 202 and a rotating angle and velocity estimation unit 203.

$$V*ds = -\text{SIN}(\theta e) \cdot V*q + \text{COS}(\theta e) \cdot V*d \tag{6}$$
$$V*qs = \text{COS}(\theta e) \cdot V*q + \text{SIN}(\theta e) \cdot V*d$$

$$ids^S = \frac{2 \cdot ia - ib - ic}{3} \tag{7}$$

$$iqs^S = \frac{ib - ic}{\sqrt{3}}$$

When using a stator circuit equation of the induction motor, d-axis (flux axis) and q-axis (torque axis) stator flux estimation values can be obtained as seen from the following equations (8) and (9). In the equations (8) and (9), $r_s$ means a stator resistance of the induction motor. A symbol ∧ above the letter used in the equations does not mean an actual measurement value but means an estimation value. Generally, voltage values used in the equations (8) and (9) are not actual measurement values but are command values calculated from the equation (6).

$$\hat{\lambda}_{ds}^s = \int (V^*_{ds} - r_s i_{ds}^s) ds \tag{8}$$

$$\hat{\lambda}_{qs}^s = \int (V^*_{qs} - r_s i_{qs}^s) ds \tag{9}$$

By using a relation between the stator and the rotor of the induction motor based on the stator flux obtained from the equations (8) and (9), rotor flux can be calculated as seen from equations (10) and (11). In the equations (10) and (11), $\sigma L_s$ is stator leakage inductance and is given as represented in the equation (12). In the equation (12), $L_s$ is stator inductance of the induction motor, $L_r$ is rotor inductance, and $L_m$ is mutual inductance.

$$\hat{\lambda}_{dr}^s = \frac{L_r}{L_m}(\hat{\lambda}_{ds}^s - \sigma L_s i_{ds}^s) \tag{10}$$

$$\hat{\lambda}_{qr}^s = \frac{L_r}{L_m}(\hat{\lambda}_{qs}^s - \sigma L_s i_{qs}^s) \tag{11}$$

$$\sigma L_s = L_s - \frac{L_m^2}{L_r} \tag{12}$$

The rotor flux calculated using the equations (11) and (12) is supplied to the rotating angle and velocity estimation unit 203, and a rotating angle $\theta_e$ of the rotor flux is calculated as represented in equation (13). In the equation (13), $\tan^{-1}$ is an inverse tangent trigonometric function. According to the kind of a sensorless controller, values of the equation (13) may be applied without correction, or calculation of a phase locked loop (PLL) may be added to the values of the equation (13).

$$\hat{\theta}_e = \tan^{-1}\frac{\hat{\lambda}_{dr}^s}{\hat{\lambda}_{qr}^s} \tag{13}$$

A magnitude $\lambda_{dr}$ of the rotor flux that is one of outputs of the flux estimation unit 201 is calculated as seen from the following equation (14), using the rotor flux of the stationary coordinate system obtained from the equations (11) and (12) and the rotating angle of the equation (13).

$$\lambda_{dr} = \text{COS}(\theta_e)\hat{\lambda}_{qr}^s - \text{SIN}(\theta_e)\hat{\lambda}_{dr}^s \tag{14}$$

In the rotating angle and velocity estimation unit 203, the equation (13) is calculated to estimate the rotating angle and the velocity. An electric rotating angle of the flux obtained from the equation (13) is converted into a mechanical rotating angle with a motor pole through the following equation (15). In the equation (15), P denotes an induction motor pole.

Further, the current electric rotating angle of the rotor is calculated using the equation (16). Also, the rotor velocity can be more precisely calculated through the phase locked loop. In the equation (16), s denotes a Laplace operator.

$$\theta_m = \theta_e \cdot \frac{2}{P} \qquad (15)$$

$$W_m = s\theta_m. \qquad (16)$$

In order to calculate a result value of the flux and rotating angle estimation unit 203 of the equations (13) to (15), the stator flux of the equations (8) and (9) must be calculated. In such a process, an integral operation is required. However, if the voltage and current values used in the equations (8) and (9) include offset, an integrator leads to a divergence, thus making it difficult to use in practical. Generally, in order to solve such a divergence, a high pass filter is applied to eliminate an influence of a DC (frequency 0) component after the integral operation has been performed as represented in the following equations (17) and (18). In the equations (16) and (17), T denotes a time constant of the high pass filter.

$$\lambda_{ds}^s = \frac{Ts}{1+Ts}\int (V_{ds}^s - r_s i_{ds}^s)dt \qquad (17)$$

$$\lambda_{qs}^s = \frac{Ts}{1+Ts}\int (V_{qs}^s - r_s i_{qs}^s)dt \qquad (18)$$

FIG. 3 shows a configuration of the rotating angle and velocity estimation unit 203. This is composed of a rotating angle calculation unit 302 and a velocity calculation unit 303. The rotating angle calculation unit 302 receives the rotor flux of the stationary coordinate system calculated by the equations (17) and (18) from the flux estimation unit 202, and calculates the rotating angle $\theta_e$ of the flux through the inverse trigonometric function of the equation (13).

The velocity calculation unit 303 converts the rotating angle $\theta_e$ of the flux into a mechanical rotating angle and performs a differential, thus obtaining a mechanical rotating velocity $W_m$ of the rotor. In the velocity calculation unit 303, P means a motor pole and is stored in an additional memory unit (not shown).

In the case of driving the induction motor by the sensorless vector control method, a method of obtaining motor flux by performing integral for a back electromotive force of the motor (stator voltage−resistance×current) as used in the equations (8) and (9) has been widely used. Voltage outputted from the inverter to the induction motor is in proportion to a rotating velocity of the motor. Thus, high voltage is required in the case of a high velocity rotation, while low voltage is required in the case of a low velocity rotation. Various analog devices such as the current sensors 113a, 113b and 113c (see FIG. 1) are used to control the inverter. In this process, offset is generally included in the calculated/measured voltage and current.

Since a magnitude of the inverter output voltage is sufficiently greater than that of the offset in a high velocity region having a large back electromotive force, it is possible to perform the integral operation of the equations (8) and (9) without any difficulty. However, in a low velocity region where a back electromotive force is small, so that the magnitude of the inverter output voltage is not sufficiently greater than that of the offset voltage, the operation of the equations (8) and (9) is affected by the offset, thus resulting in the divergence. Hence, it is impossible to use the integral operation of the equations (8) and (9) in practical, and the high pass filter is frequently used together with the integral operation as in the equations (17) and (18) so as to minimize an influence of the offset (frequency 0). In the case of using the high pass filter, the offset of the voltage and current can be overcome. However, the calculation of the equations (17) and (18) is greatly affected by the time constant of the high pass filter. In order to acquire a required flux estimation performance, the time constant of the filter must be sufficiently larger than the rotating velocity of the motor. Therefore, the time constant of the high pass filter must be appropriately selected in consideration of a main operating region of the motor and phase error characteristics of the filter. However, such a method is problematic in that the time constant of the filter must be reduced in a region having a very low frequency, so that it is difficult to expect good flux estimation performance because of the characteristics of the high pass filter such as a phase delay resulting from the reduced time constant.

Further, in the general sensorless vector control, flux is estimated not by real voltage inputted into the motor but by a command voltage of the controller. In the low velocity region where the magnitude of voltage is reduced, an error in voltage caused by dead time affects the estimation of the flux, so that there occurs a difference between command voltage used in the calculation of flux and voltage inputted actually into the motor. The difference leads to an error in the flux estimation.

SUMMARY OF INVENTION

Accordingly, an object of the present invention is to provide a flux controller for a motor, which is mounted on an inverter-motor drive system for driving the induction motor having no velocity or position sensor at variable velocity, thus maintaining sensorless flux estimation performance even in a low velocity region where a magnitude of voltage is small.

In order to accomplish the object, there is provided a flux controller for an induction motor using a sensorless vector control method, the controller comprising a velocity controller for receiving a difference in velocity between a velocity command and an estimated velocity to output a torque current command, a torque current controller for receiving the torque current command to output a torque voltage command, a flux controller for receiving a difference in flux between a flux command and an estimated flux value to output a flux current command, a flux current controller for receiving the flux current command to output a flux voltage command, a three-phase converter for converting the torque voltage command and the flux voltage command into a three-phase voltage command applied to the induction motor to output the three-phase voltage command, a flux estimator for receiving a three-phase current of the induction motor, the torque voltage command and the flux voltage command to output a rotating angle of a rotor of the induction motor, an estimated flux value of the rotor and an estimated velocity of the rotor, and a flux regulator for receiving the torque voltage command and the estimated velocity to output a gain value that regulates a magnitude of the flux command, wherein the flux regulator increases the magnitude of the flux command when a rotating velocity of the rotor is low. Therefore, the flux controller is advantageous in that a magnitude of torque command voltage is not reduced below a predetermined value, so that flux estimation performance can maintain reliability even at low velocity.

The flux controller further includes a multiplier for receiving the gain value of the flux regulator to output a value produced by multiplying the gain value and the flux command.

Further, the flux regulator includes a flux regulation controller for receiving a difference between the torque voltage command and a preset minimum flux command voltage to control a gain, a comparator for determining whether the estimated velocity is a preset velocity or less, and a selector for outputting the gain value when it is determined by the comparator that the estimated velocity is the preset velocity or less.

The flux regulator further includes a limiter for limiting the gain from the flux regulation controller within a preset range to output the gain value.

Further, the preset range is 100% in a lower limit, and is 200% in an upper limit.

Further, the minimum flux command voltage is set to be 10% of rated voltage of the induction motor.

Further, the selector outputs a gain value that does not affect a value of the flux command when it is determined by the comparator that the estimated velocity is the preset velocity or more.

The present invention provides a flux controller for an inductor motor configured to generate a torque voltage command and a flux voltage command to control the induction motor by a velocity difference between a velocity command and an estimated velocity and a flux difference between a flux command and an estimated flux, the flux controller including a flux regulator for outputting a gain value that is increased by multiplying the estimated velocity and the flux command when the estimated velocity is a preset value or less.

DETAILED DESCRIPTION OF THE INVENTION

Hereinafter, a flux controller according to the present invention will be described in detail with reference to the accompanying drawings.

Figure 1:
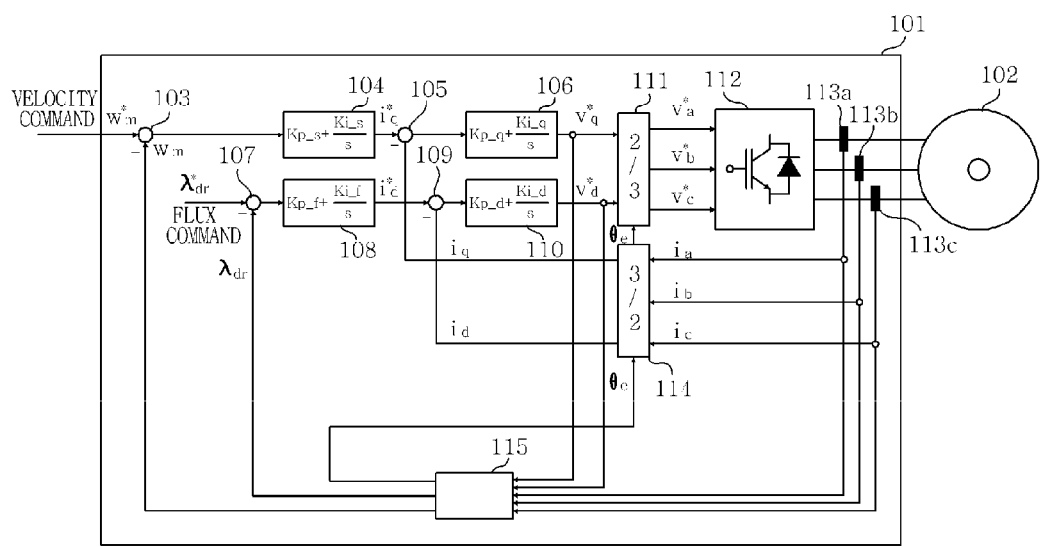
FIG. 1 is a block diagram illustrating a conventional flux controller for an induction motor using a sensorless vector control method.
Figure 2:
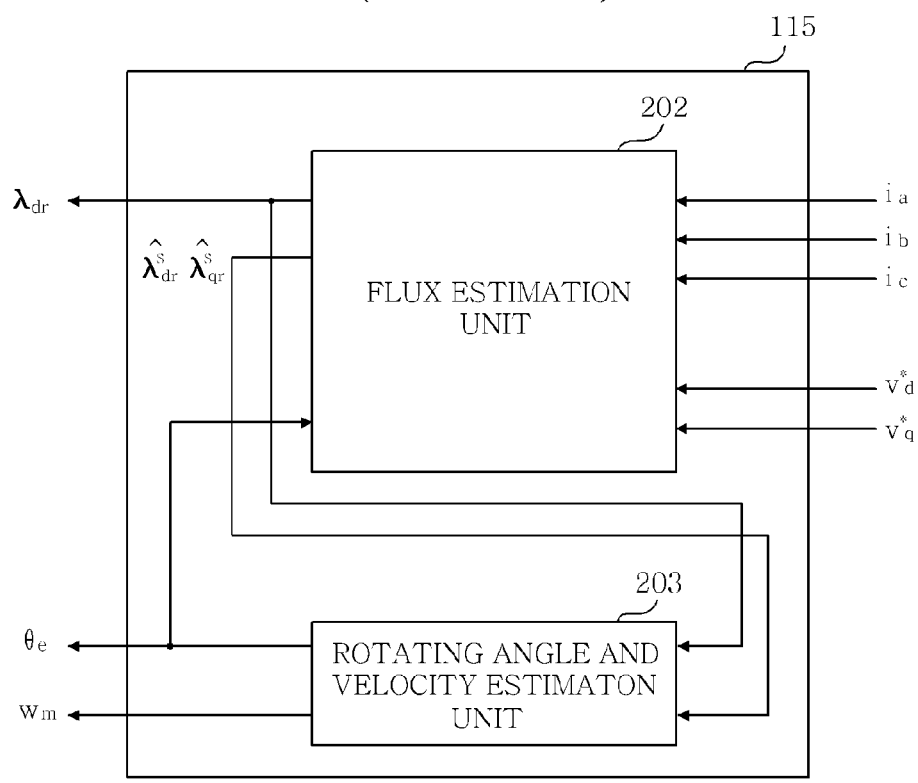
FIG. 2 is a block diagram illustrating a conventional sensorless flux estimator.
Figure 3:
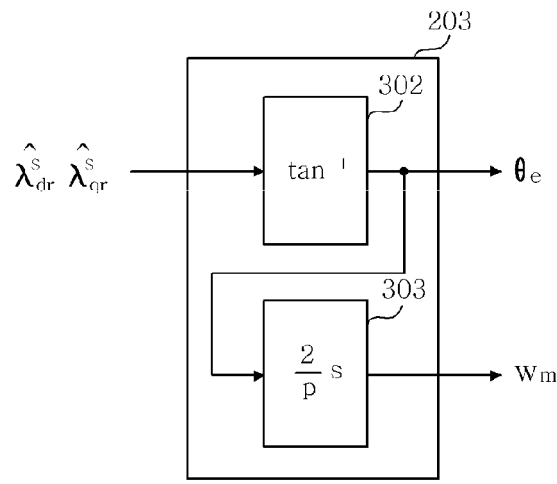
FIG. 3 is a block diagram illustrating a rotating angle and velocity estimation unit of the conventional sensorless flux estimator.
Figure 4:
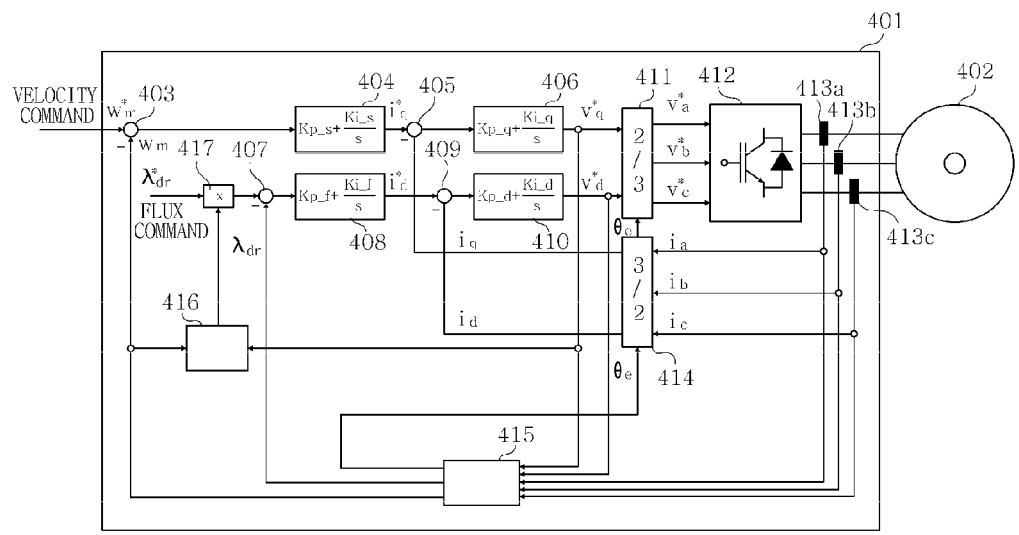
FIG. 4 is a block diagram illustrating a flux controller for an induction motor equipped with a flux regulator according to the present invention.

FIG. 4 is a block diagram illustrating a configuration of an induction motor system that is equipped with a flux controller according to the present invention and is driven at variable velocity by a sensorless vector control method without a velocity and position sensor.

According to a concept of the present invention, a flux regulator 416 is disposed in an inverter 401 to maintain flux estimation performance in a low velocity region. The flux regulator 416 receives a present motor velocity $W_m$ from a sensorless flux estimator 415, and receives a torque voltage command $V^*_q$ from a flux current controller 406. Further, the flux regulator 416 outputs a gain to a multiplier 417. Here, the gain regulates a magnitude of a flux command inputted into a subtractor 407 for calculating a flux error.

The multiplier 417 multiplies the gain inputted from the flux regulator 416 and a flux command $\lambda^*_{dr}$ to obtain a final flux command.

Since an operation from the subtractor 403 to the sensorless flux estimator 415 as shown in FIG. 4 remains the same as the operation described in the prior art, a duplicated description thereof will be omitted. The operation of the flux regulator 416 will be chiefly described.

Since a configuration of the sensorless flux estimator 415 according to the present invention remains the same as an existing configuration, the flux estimator 415 has a limit on flux estimation performance in the low velocity region, which is the feature of an integral of a back electromotive force+a high pass filter method.

The flux regulator 416 according to the present invention is characterized in that it regulates the magnitude of the flux command in the low velocity region so as to minimize the limit on performance of the conventional sensorless flux estimator.

If Laplace transformation is carried out for the equation (17) without considering a resistance term of a stator, a relation between voltage and flux is obtained as represented in the following equation (19).

Generally, the induction motor controls flux to keep it constant, below a rated velocity. Thus, in order to keep the flux constant, it can be seen that high voltage is required in the case of a high velocity and low voltage is required in the case of a low velocity when substituting jw for s in the equation (19), where s is a Laplace operator and w is an angular frequency.

$$\lambda^s_{ds} = \int (V^s_{ds} - r_s i^s_{ds}) dt \approx \int V^s_{ds} dt \Rightarrow \lambda^s_{ds}(s) = \frac{V^s_{ds}}{s} \quad (19)$$

When estimating sensorless flux under a constant flux control, an error occurs in estimation in the low velocity region where the magnitude of voltage is small. If the magnitude of the flux is intentionally increased in the low velocity region, voltage inputted into the motor is also increased as seen by the equation (19), and voltage used in sensorless calculation is also increased. The larger the magnitude of voltage is, the less an influence such as offset or deadtime is. As a result, it is advantageous to estimate the sensorless flux.

Figure 5:
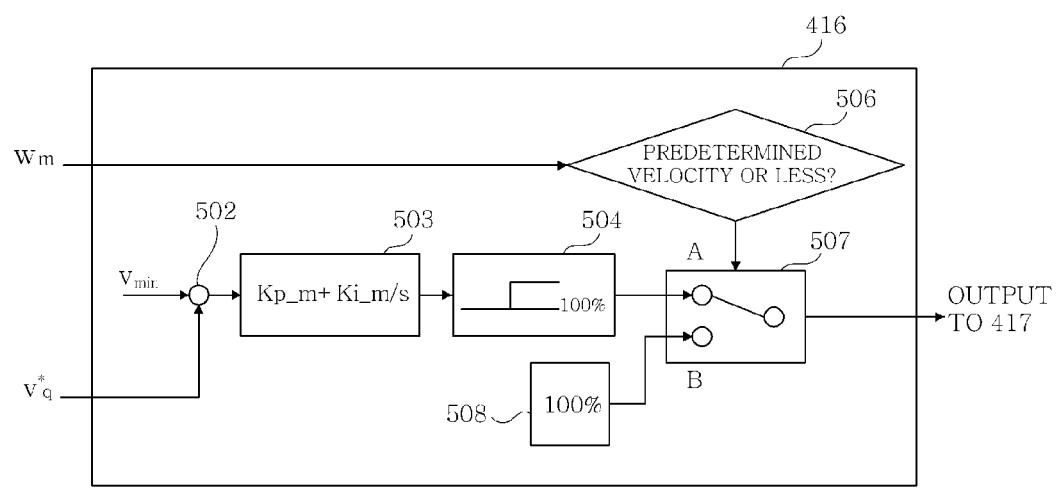
FIG. 5 is a block diagram illustrating the flux regulator included in the flux controller according to the present invention.

FIG. 5 is a block diagram illustrating a configuration of the flux regulator 416.

As described above, an aim of the flux regulator 416 is to maintain the magnitude of a torque command voltage so that it does not fall below a predetermined value, so as to increase the flux in low velocity region and thereby keep the magnitude of voltage applied to the motor large.

The torque flux command voltage is used for the following reason: because the magnitude of the torque command voltage in a normal state may approximate the following equation (20) in the case of ignoring a resistance value of the stator, the magnitude of the torque flux command voltage may be used as a physical quantity that is in proportion to a rotating velocity regardless of a change in load (change in q-axis current) that may occur during an operation.

$$V^*_q \approx W_e L_s i^e_{ds} \quad (20)$$

The subtractor 502 calculates a difference between a minimum flux command voltage $V_{min}$ and an output of a flux current controller 410, and inputs the difference into a flux regulation controller 503.

The minimum flux command voltage $V_{min}$ is a minimum torque voltage that allows an integral of a back electromotive force for sensorless flux estimation to be smoothly performed without being affected by offset, is experimentally determined by taking 10% of rated voltage as an initial value, and then is stored in an additional storage unit (not shown).

When the torque command voltage $V^*_q$ is smaller than the minimum flux command voltage $V_{min}$ that is a reference value, the flux regulation controller 503 increases a gain multiplied by the flux command $\lambda^*_{dr}$ via the multiplier 417, thus resulting in increasing a command flux level and thereby keeping torque command voltage constant. $K_{p\_m}$ is a proportional gain, $K_{i\_m}$ is an integral gain, and s is a Laplace operator.

Meanwhile, a limiter 504 limits the flux regulation controller 503 such that it is operated to merely increase flux, namely, voltage. The limiter 504 sets a lower limit to be 100%, and sets an upper limit to be less than 200%. Since the flux regulator of the present invention is intended to improve sensorless performance in the low velocity region, it is unnecessary to operate the flux regulator in the high velocity region.

A comparator 506 compares a present velocity with a predetermined velocity, and changes a state of a selector 507 depending on the compared result. In response to a value of the comparator 506, an output of the selector 507 is connected to an input 'A' so that an output of the flux regulation controller 503 is multiplied by the flux command $\lambda^*_{dr}$ via the multiplier 417 when the velocity is a predetermined value or less. Meanwhile, when the velocity is the predetermined value or more, the output of the selector 507 is connected to an input 'B' to ignore the operation of the flux regulation controller 503.

When it is determined by the comparator 506 that the motor velocity is the predetermined value or more, a storage unit 508 previously stores a value (100%) which prevents the output of the flux regulation controller 503 from affecting the flux command $\lambda^*_{dr}$.

The flux regulator 416 according to the present invention enables the torque voltage command $V^*_q$ of the synchronous coordinate system to maintain a predetermined value or more. It should be noted that sensorless flux calculation does not use a reference voltage of the synchronous coordinate system but uses a reference voltage of the stationary coordinate system.

As seen from the equation (6), when a value of $V^*_q$ maintains a predetermined value or more, the magnitude of the reference voltage of the stationary coordinate system used in the sensorless flux estimation of the equations (17) and (18) is also increased, thus compensating for incomplete flux estimation in the low velocity region where the voltage is low.

Therefore, the flux controller is advantageous in that the flux estimation performance can be maintained regardless of velocity.

The present invention is directed to a flux controller for a motor, which is mounted on an inverter-motor drive system for driving an induction motor having no velocity or position sensor at variable velocity to prevent torque command voltage from being reduced below a predetermined value, thus preventing a magnitude of voltage applied to the motor from being reduced below a predetermined value even in a low velocity region and thereby maintaining sensorless flux estimation performance even in the low velocity region where the magnitude of the voltage is small and an error occurs in sensorless flux estimation.

The preferred embodiments of the present invention have been described in detail with reference to the accompanying drawings. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flux controller for an induction motor using a sensorless vector control method, comprising:
   a velocity controller for receiving a difference in velocity between a velocity command and an estimated velocity to output a torque current command;
   a torque current controller for receiving the torque current command to output a torque voltage command;
   a flux controller for receiving a difference in flux between a flux command and an estimated flux value to output a flux current command;
   a flux current controller for receiving the flux current command to output a flux voltage command;
   a three-phase converter for converting the torque voltage command and the flux voltage command into a three-phase voltage command applied to the induction motor to output the three-phase voltage command;
   a flux estimator for receiving a three-phase current of the induction motor, the torque voltage command and the flux voltage command to output a rotating angle of a rotor of the induction motor, an estimated flux value of the rotor and an estimated velocity of the rotor; and
   a flux regulator for receiving the torque voltage command and the estimated velocity to output a gain value that regulates a magnitude of the flux command,
   wherein the flux regulator increases the magnitude of the flux command when a rotating velocity of the rotor is low.

2. The flux controller as set forth in claim 1, further comprising:
   a multiplier for receiving the gain value of the flux regulator to output a value produced by multiplying the gain value and the flux command.

3. The flux controller as set forth in claim 2, wherein the flux regulator includes:
   a flux regulation controller for receiving a difference between the torque voltage command and a preset minimum flux command voltage to control a gain;
   a comparator for determining whether the estimated velocity is a preset velocity or less; and
   a selector for outputting the gain value when it is determined by the comparator that the estimated velocity is the preset velocity or less.

4. The flux controller as set forth in claim 3, wherein the flux regulator further includes:
   a limiter for limiting the gain from the flux regulation controller within a preset range to output the gain value.

5. The flux controller as set forth in claim 4, wherein the preset range is 100% in a lower limit, and is 200% in an upper limit.

6. The flux controller as set forth in claim 3, wherein the minimum flux command voltage is set to be 10% of rated voltage of the induction motor.

7. The flux controller as set forth in claim 3, wherein the selector outputs a gain value that does not affect a value of the flux command when it is determined by the comparator that the estimated velocity is the preset velocity or more.

8. The flux controller as set forth in claim 1, wherein the flux regulator includes:
   a flux regulation controller for receiving a difference between the torque voltage command and a preset minimum flux command voltage to control a gain;

a comparator for determining whether the estimated velocity is a preset velocity or less; and a selector for outputting the gain value when it is determined by the comparator that the estimated velocity is the preset velocity or less.

9. The flux controller as set forth in claim 8, wherein the flux regulator further includes:

a limiter for limiting the gain from the flux regulation controller within a preset range to output the gain value.

10. The flux controller as set forth in claim 9, wherein the preset range is 100% in a lower limit, and is 200% in an upper limit.

11. The flux controller as set forth in claim 8, wherein the minimum flux command voltage is set to be 10% of rated voltage of the induction motor.

12. The flux controller as set forth in claim 8, wherein the selector outputs a gain value that does not affect a value of the flux command when it is determined by the comparator that the estimated velocity is the preset velocity or more.

* * * * *